(12) United States Patent
Gasser et al.

(10) Patent No.: US 8,162,196 B2
(45) Date of Patent: Apr. 24, 2012

(54) DEVICE FOR PROCESSING A BELT STRAP FOR STORING SCREWS

(75) Inventors: Daniel Gasser, Diepoldsau (CH); Werner Zwicky, Berneck (CH)

(73) Assignee: SFS intec Holding AG, Heerbrugg (CH)

( * ) Notice: Subject to any disclaimer, the term of this patent is extended or adjusted under 35 U.S.C. 154(b) by 190 days.

(21) Appl. No.: 12/595,561

(22) PCT Filed: Apr. 16, 2008

(86) PCT No.: PCT/EP2008/003022
§ 371 (c)(1),
(2), (4) Date: Oct. 12, 2009

(87) PCT Pub. No.: WO2008/128687
PCT Pub. Date: Oct. 30, 2008

(65) Prior Publication Data
US 2010/0140317 A1  Jun. 10, 2010

(30) Foreign Application Priority Data
Apr. 18, 2007 (DE) .................... 20 2007 005 605 U

(51) Int. Cl.
*F16B 15/08* (2006.01)
(52) U.S. Cl. ......... 227/135; 227/139; 411/442; 206/347
(58) Field of Classification Search .................. 227/135, 227/136, 139; 411/442, 443, 444; 206/345, 206/346, 347
See application file for complete search history.

(56) References Cited

U.S. PATENT DOCUMENTS

| 2,012,615 | A | | 8/1935 | Mason |
| 4,139,036 | A | | 2/1979 | Regan et al. |
| 5,046,396 | A | * | 9/1991 | Pfister ......................... 89/35.01 |
| 5,104,270 | A | * | 4/1992 | Ritzl .............................. 411/85 |
| 5,813,114 | A | | 9/1998 | Blacket et al. |

(Continued)

FOREIGN PATENT DOCUMENTS

AT  383764  8/1987

(Continued)

*Primary Examiner* — Lindsay Low
(74) *Attorney, Agent, or Firm* — Volpe and Koenig, P.C.

(57) ABSTRACT

A device for processing a belt strap for storing screws, in which the belt strap has a flat, U-shaped cross section that has a periphery that has a ratio of no more than 11:10 relative to the non-flanged belt. A guide device for the belt strap guides and holds the belt strap. The screws can be pressed out from the upper side of the belt strap. The guide device (3) has two guide slits (10) receiving the belt strap (2) in at least the region of the flanges (4), each slit being L-shaped in cross section and each having a contact surface (5) for the underside (6) of the belt (20) and a guide rib (11) extending across the flange (4). A distance (M) of each guide rib (11) from the contact surface (5) has a value greater than the belt thickness (D) and less than a length (Q) of a corner diagonal (12) of the belt strap (2) extending in the U-shaped cross section between the points at which the inner side (7) of the flange (4) intersects the upper side (9) of the belt (20) and one of the outer sides (17) of the belt strap (2) intersects the underside (6) of the belt (2).

4 Claims, 3 Drawing Sheets

U.S. PATENT DOCUMENTS

| | | | |
|---|---|---|---|
| 6,116,835 A * | 9/2000 | Blacket et al. | 411/442 |
| 6,620,011 B2 * | 9/2003 | Obermeier et al. | 411/442 |
| 6,783,001 B2 * | 8/2004 | Wollner | 206/338 |
| 2003/0178334 A1 * | 9/2003 | Pally et al. | 206/345 |
| 2004/0042875 A1 | 3/2004 | Huang | |
| 2007/0292239 A1 * | 12/2007 | Lin | 411/442 |

FOREIGN PATENT DOCUMENTS

| | | |
|---|---|---|
| AT | 389745 | 1/1990 |
| DE | 8817271 | 8/1996 |
| WO | 9509705 | 4/1995 |
| WO | 0156748 | 8/2001 |

* cited by examiner

DEVICE FOR PROCESSING A BELT STRAP FOR STORING SCREWS

BACKGROUND

The invention relates to a device for processing a belt strap for storing screws with a flat belt that is provided on each of its opposing longitudinal edges with a flange extending in the longitudinal direction of the belt strap and projecting upwards from the belt, such that the belt strap has a flat, U-shaped cross section, wherein the cross section of the strap belt has a periphery that has a maximum ratio of 11:10 relative to that of the non-flanged belt, with a guide device for the belt strap, wherein this guide device guides and holds the belt strap, while the screws can be pressed out from the belt strap by a screwdriver from the top side of the belt strap.

Belt straps and devices for their processing are known for various special applications. Here, the flanges on the belt strap are used in a wide range of shapes that are usually symmetric to the belt. The symmetry is also largely maintained between the upper side and the lower side of the belt, especially for the purpose of increasing the stability of the belt strap, in order to achieve minimal deformation with respect to bending when a fastener is pressed out from the belt strap. According to experience, bending that is too great is associated with higher susceptibility to failure during use. A belt strap of the type specified in the preamble of Claim 1 is known (U.S. Pat. No. 5,813,114) in which the flanges are used mainly for stabilizing and reinforcing the belt strap and contribute less to guidance. In a known device of the type named above (U.S. Pat. No. 5,813,114), the belt strap is set with the bottom side of the belt on the upper edge of a cylindrical feed channel into which a fastener pressed out from the belt strap can fall. Up until now, someone skilled in the art would be of the opinion that, when placing screws, the flange should be guided and clamped in a guide device in the direction of the flow of forces, so that the bending of the belt strap remains minimal. A disadvantage here, however, is a large surface-area contact between the belt strap and guide device that makes the device susceptible to failure.

SUMMARY

The objective of the invention is to construct a device for processing a belt strap for storing screws, such that a simpler guide device that is not susceptible to failure can be used in the device and therefore higher reliability of the device is achieved.

With the device according to the invention, the objective is met in that the guide device has two guide slots holding the belt strap at least in the region of the flange, wherein these slots each have an L-shaped cross section and a contact surface for the bottom side of the belt and a guide rib extending across the flange, wherein the distance of each guide rib from the contact surface has a value that is greater than the belt thickness and less than a length of a corner diagonal of the belt strap, wherein this diagonal extends in the U-shaped cross section between the points at which the inner side of a flange intersects with the top side of the belt or one of the outer sides of the belt strap with the bottom side of the belt. The cross section of the belt strap has a periphery that has a maximum ratio of 11:10 relative to that of the non-flanged belt. The belt and the belt strap differ in their peripheries only by the height of the flange. The periphery is thus lengthened by four times the value of the projecting flange height by which each flange exceeds the thickness D of the belt. This height H is designed accordingly so that it equals a maximum of 2.5% of the periphery of the non-flanged belt. The shape of the guide slot can be adapted to the flange so that, on the inner side of the flange, a maximum contact surface is produced. Here, however, care must also be taken that the production tolerance of the belt strap cannot lead to a blockage of the belt strap in the guide slot due to the advance of the belt strap, which could be produced by a mutual contact over a large surface area. In contrast to the prior thought of the technical world, tests have shown that a contact length of less than 2% of the periphery forming the base of the non-flanged belt is sufficient to guarantee the normal function of the belt strap with the guide device of the device according to the invention. If the belt strap is exposed to extreme loads or if the belt strap is made from an especially soft plastic material or the like, the pressing of the widest position on the belt strap out through the guide slot is prevented. Even if the belt strap with a U-shaped cross section could be stretched into a nearly flat belt by the high forces, this widest position on the belt strap could be prevented from being pressed outward. Through the minimal dimensions of the corner diagonals, the problem is solved with a minimum of belt strap material. The projecting flange height could also have a minimal construction. In this respect, an optimum is reached when the belt thickness and the projecting flange height together correspond approximately to the sum of the corner diagonal and the belt thickness. Thus, each flange lies on the contact surface of the guide device at least on the length of the belt thickness.

Advantageous constructions of the invention form the subject matter of the subordinate claims.

Therefore, because the distance of the guide rib from the contact surface for the bottom side of the belt to the flange width has a ratio of 1:1, it is achieved that even for very high loads when the screws are pressed out from the belt strap, the flanges are held in the guide slots. Through reinforcement in the transition from the belt to the flanges, the flanges that are advantageously constructed at a right angle to the belt are reinforced, so that greater deformation is prevented.

In another construction of the device according to the invention, the belt strap contacts the guide device on each side at a maximum of two positions. Here it is essential that the belt strap is supported in the loading direction with a contact surface on the bottom side of the belt on the guide device and thus can absorb the processing forces produced by the pressing out of the screws during placement. The second contact surface on the flange is used such that the belt strap cannot be bent significantly downward in cross section by the processing forces.

In the preferred construction of the device according to the invention, the belt strap contacts, on the outside, the bottom side of the belt and the two inner sides of the flange with additional contact surfaces of the guide device. In addition to the contact surface on the inner side of the flange, it is sufficient that the belt strap contacts the bottom side of the belt with the guide device. Additional contact surfaces are neither necessary nor useful, because otherwise larger friction surfaces would be present. The positioning of the belt strap in the guide device is guaranteed sufficiently exactly by the flange on the belt, so that the guide device may have a lot of play at the positions at which it has no contact with the belt strap.

Additional advantages and constructions of the invention are given from the description and the accompanying drawings.

BRIEF DESCRIPTION OF THE DRAWINGS

Embodiments of the invention are explained in greater detail below with reference to the drawings. Shown are.

DETAILED DESCRIPTION OF THE PREFERRED EMBODIMENTS

Figure 1:
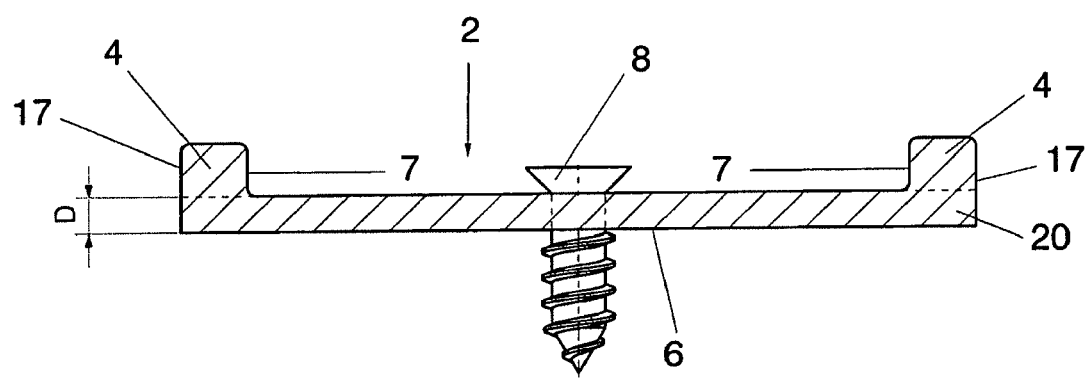
FIG. 1 is a cross section of a belt strap for storing screws.

On a belt strap 2 for storing screws 8 shown in cross section in FIG. 1, flanges 4 project past the top side 9 of a flat belt 20. On the top side 9, the screws 8 can be inserted with their shafts into the belt 20 of the belt strap 2. Through the arrangement of the flanges 4 on the same side of the belt strap as the heads of the screws 8 it is achieved that the bottom side 6 of the belt 20 can be supported over a large area during the finishing work using the belt strap 2 with the screws 8.

Figure 2:
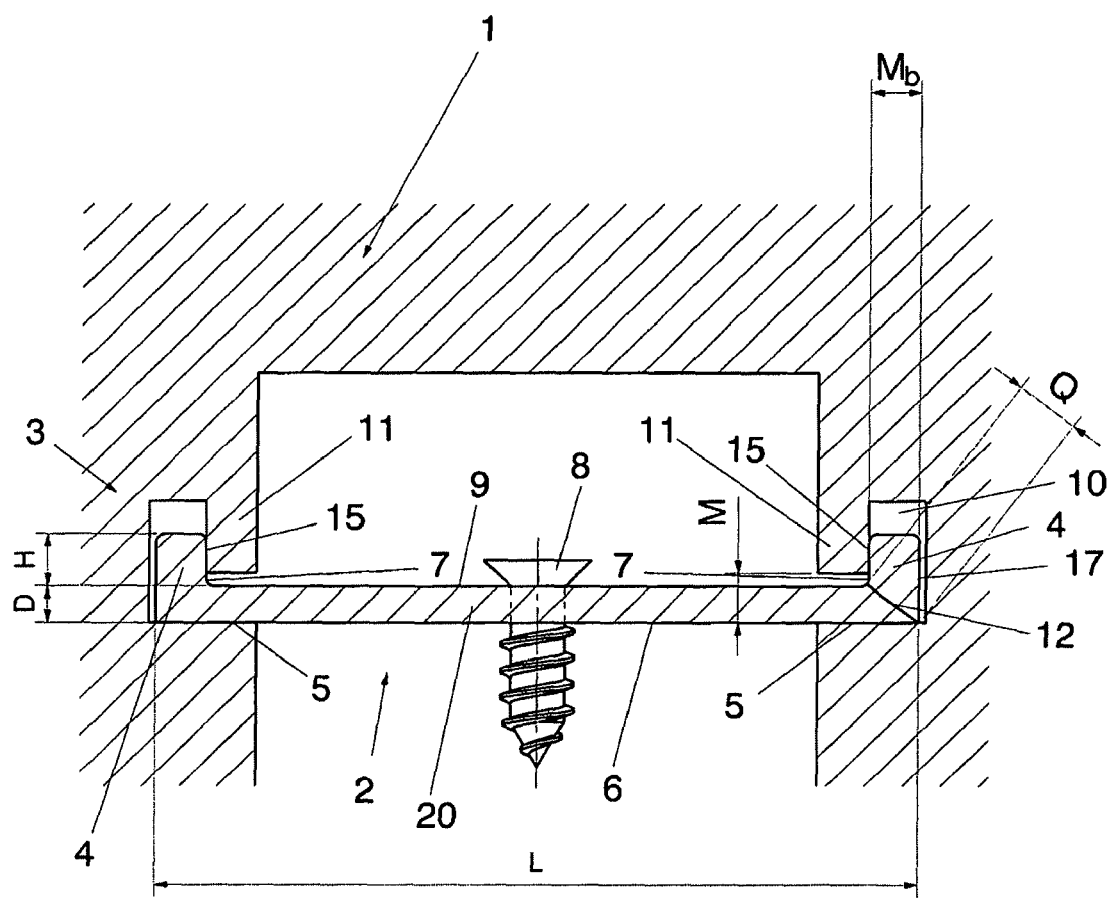
FIG. 2 is a cross section of a device for processing a belt strap with a narrow guide device for the belt strap.

One variant of a device 1 for processing a belt strap is shown in FIG. 2. A guide device 3 has guide slots 10 that each have an L-shaped cross section and that each have a contact surface 5 for the bottom side 6 of the belt 20 of the belt strap 2 and a guide rib 11 extending across the flange 4, wherein the distance M of the guide rib from the contact surface 5 has a value lying between the belt thickness D and the length Q of a corner diagonal 12 of the belt strap 2, wherein this corner diagonal extends in the U-shaped cross section between the points at which the inner side 7 of a flange 4 intersects with the top side 9 of the belt 20 or one of the outer sides of the belt strap 2 intersects with the bottom side 6 of the belt 20.

The cross section of the belt strap 2 has a periphery that has a maximum ratio of 11:10 relative to that of the non-flanged belt 20. The combination described here of the guide device 3 and belt strap 2 with flanges 4 allows the belt strap 2 on the inner side 7 of the flange 4 to contact, with a minimal surface area, another contact surface 15 on the guide ribs 11. Typically, in the shown cross section in FIG. 2, 4 times the height H equals at most 10 percent of the sum of 2 times the belt thickness D and 2 times the belt strap or belt width L, which corresponds to the periphery of the non-flanged, flat belt 20.

Figure 3:
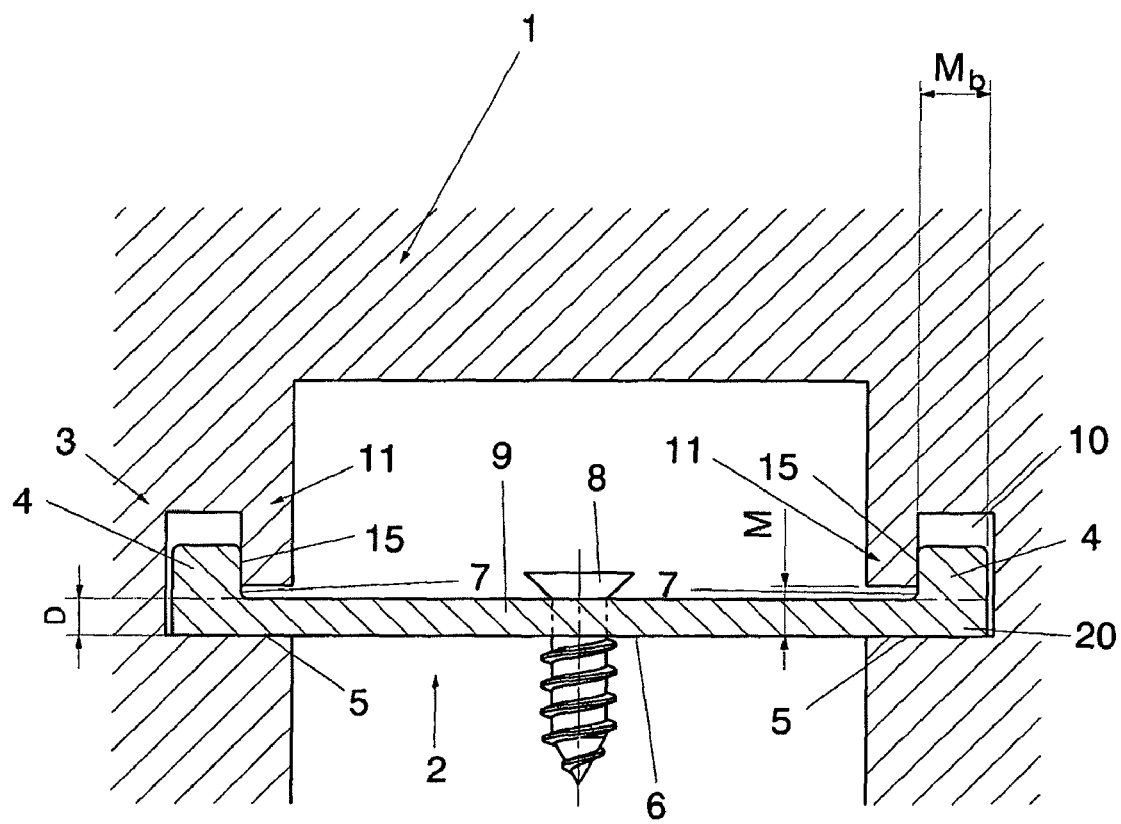
FIG. 3 is a cross section of a device for processing the belt strap according to FIG. 1 with a guide device for the belt strap.

In the preferred construction according to FIG. 3, the distance M of the guide rib from the contact surface 5 for the bottom side of the belt 20 to the flange width Mb features a ratio of 1:1. This minimum measure of the flange width Mb prevents the flange 4 from being pulled out from the guide slot 10, because even in the most unfavorable case, like when the flange 4 is bent downward, a new flange height that corresponds to the distance M remains in the extension of the flat belt 20.

In one construction of the device 1 for processing a belt strap 2, the belt strap 2 contacts the guide device 3 at a maximum of two points on each side. In order to prevent the strap from being pulled out, the belt strap 2 must have at least two contact points with the guide device 3 on each side, namely, at the contact surfaces 5 and at the additional contact surfaces 15. The length of the guide device 3 has further influence on the pull-out behavior of the belt strap 2. For this purpose, it must be taken into account that, according to the construction of the belt strap 2, there is also the possibility that, for purposes of advancing the belt, openings in the form of notches and the like are formed in the flanges 4. In this case, the guide device 3 should be dimensioned so long that the notches take up a maximum of one fourth of the guide length.

In the preferred construction of the device 1 for processing a belt strap 2, the belt strap 2 is in contact with the guide device 3 at the bottom side 6 of the belt 20 and at the two inner sides 7 of the flange 4. Typically, the belt strap 2 contacts, on each longitudinal side, the guide device 3 at the two mentioned positions in the flange region on the contact surfaces 5 and on the additional contact surfaces 15. By the loading when the screws 8 are set, the belt strap 2 is pressed on the bottom side 6 of the belt 20 more strongly against the contact surfaces 5 and simultaneously pressed on the inner side 7 of the flange 4 also with increased force against the additional contact surfaces 15 on the guide device 3. The position of the belt strap 2 is simultaneously held and fixed during the highest loading also within the guide device 3. The screws 8 can be positioned and placed accordingly with more precision.

REFERENCE SYMBOLS

1 Device for processing a belt strap
2 Belt strap
3 Guide device
4 Flange
5 Contact surfaces
6 Bottom side
7 Inner sides
8 Screws
9 Top side
10 Guide slot
11 Guide rib
12 Corner diagonal
15 Additional contact surfaces
17 Outer sides
20 Belt
M Distance between guide rib and contact surface
Mb Flange width
Q Length of corner diagonal
D Belt thickness
H Flange height projecting past the belt
L Belt strap width=belt width

The invention claimed is:

1. Device for processing a belt strap for storing screws with a flat belt that is provided on each opposing longitudinal edge with a flange extending in a longitudinal direction of the belt that projects upward from the belt, such that the belt strap has a flat, U-shaped cross section, and the cross section of the belt strap has a periphery that has a maximum ratio of 11:10 relative to that of the flat, non-flanged belt, the device comprising:

a guide device for the belt strap that guides and holds the belt strap, while the screws can be pressed out from the belt strap by a screwdriver from a top side of the belt strap, the guide device (3) has two guide slots (10) holding the belt strap (2) at least in a region of the flange (4), the guide slots each have an L-shaped cross section and a contact surface (5) for a bottom side (6) of the belt (20) and a guide rib (11) extending across the flange (4), wherein a distance (M) of each of the guide ribs (11) from the contact surface (5) has a value that is greater than a belt thickness (D) and less than a length (Q) of a corner diagonal (12) of the belt strap (2), wherein the corner diagonal extends in the U-shaped cross section between points at which an inner side (7) of a flange (4) intersects with a top side (9) of the belt (20) and an outer side (17) of the belt strap (2) intersects with the bottom side (6) of the belt (2).

2. Device according to claim 1, wherein the distance (M) of the guide rib (11) from the contact surface (5) for the bottom side of the belt (20) to a flange width (Mb) has a ratio of 1:1.

3. Device according to claim 1, wherein the belt strap (2) contacts the guide device (3) on each side at a maximum of two points.

4. Device according to claim 3, wherein the belt strap (2) is in contact with additional contact surfaces (15) of the guide device (3) in addition to the bottom side (6) of the belt (20) at the two inner sides (7) of the flanges (4).

* * * * *